United States Patent
Winner et al.

[19]

[11] Patent Number: 6,031,600
[45] Date of Patent: Feb. 29, 2000

[54] METHOD FOR DETERMINING THE POSITION OF AN OBJECT

[75] Inventors: Hermann Winner; Alain Gaillard, both of Karlsruhe; Werner Uhler, Bruchsal, all of Germany

[73] Assignee: Robert Bosch GmbH, Stuttgart, Germany

[21] Appl. No.: 09/171,515

[22] PCT Filed: Feb. 6, 1997

[86] PCT No.: PCT/DE97/00222

§ 371 Date: Oct. 20, 1998

§ 102(e) Date: Oct. 20, 1998

[87] PCT Pub. No.: WO97/40404

PCT Pub. Date: Oct. 30, 1997

[30] Foreign Application Priority Data

Apr. 23, 1996 [DE] Germany .......................... 196 16 038

[51] Int. Cl.$^7$ .............................. G01C 3/00; G01C 3/08; G03B 13/00
[52] U.S. Cl. .......................... 356/3.01; 356/3.1; 356/5.1; 396/106; 180/169
[58] Field of Search .................................. 356/5.1, 3.01, 356/3.1; 396/106; 180/169

[56] References Cited

U.S. PATENT DOCUMENTS

| | | |
|---|---|---|
| 4,567,347 | 1/1986 | Ito et al. . |
| 4,881,809 | 11/1989 | Thierry . |
| 5,172,155 | 12/1992 | Kosaka . |
| 5,521,694 | 5/1996 | Osterwalder ........................... 356/3.08 |
| 5,754,280 | 5/1998 | Kato et al. ............................. 356/3.06 |

FOREIGN PATENT DOCUMENTS

| | | |
|---|---|---|
| 0 479 273 | 4/1992 | European Pat. Off. . |
| 2 131 642 | 6/1984 | United Kingdom . |

OTHER PUBLICATIONS

Y. D. Chen et al, "Dynamic Calibration and Compensation of a 3D Laser Radar Scanning system", Proceedings of the International Conference on Robotics and Automat, Atlanta, XP0000409872, Institute of Electrical and Electronics Engineers, vol. 3, May 2, 1993, pp. 652–658.

Marszalec et al., "Performance Tests of an Angular Scan LED Array–Based Range Imaging Sensor", Proceedings SPIE, Conference on Laser Dimensional Metrology, Recent Advances for Industrial Application, XP000677571, vol. 2088, Brighton, UK, Oct. 7, 1993, pp. 59–68.

J.A. Marzalee et al., "Performance test of an angular scan LED array–based range imaging sensor", Proc. of the SPIE—the International Society for Optical Engineering, 2088 (1994), pp. 59–68.

*Primary Examiner*—Stephen C. Buczinski
*Attorney, Agent, or Firm*—Kenyon & Kenyon

[57] ABSTRACT

In a method for determining the position of an object with reference to a measurement device having an optical transmitter which emits a light beam at a varying transmission angle, and having an angularly resolving optical receiver spaced away from the transmitter, a conclusion being drawn, from the respective transmission angle and from the respective angle at which the receiver receives radiation reflected from the object (reception angle), as to the resolution cell, defined by the angular resolution of the transmitter and the receiver, in which the object is located, the light beam emitted from the transmitter is modulated. The phase difference between the modulation of the transmitted light beam and the modulation of the received radiation is measured. From the phase difference, the position of the object within the respective resolution cell is calculated.

4 Claims, 3 Drawing Sheets

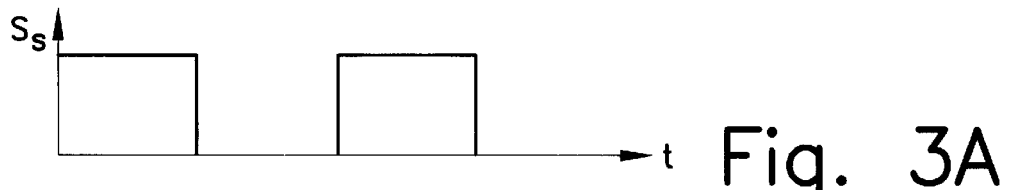
Fig. 3A
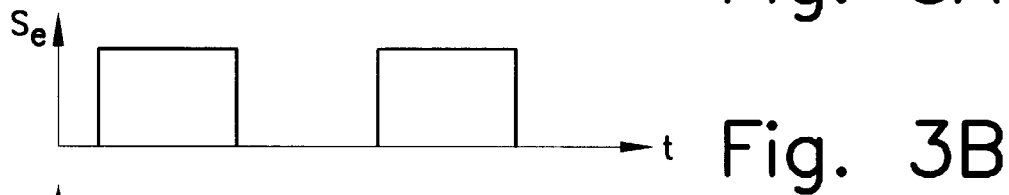
Fig. 3B
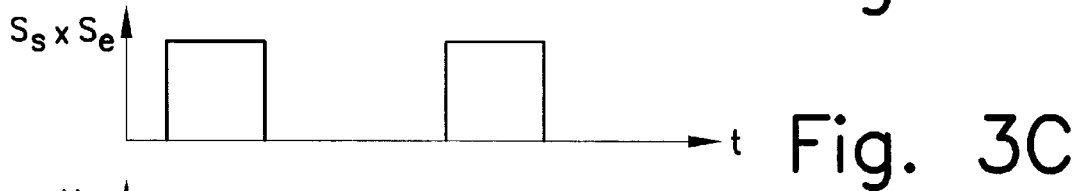
Fig. 3C
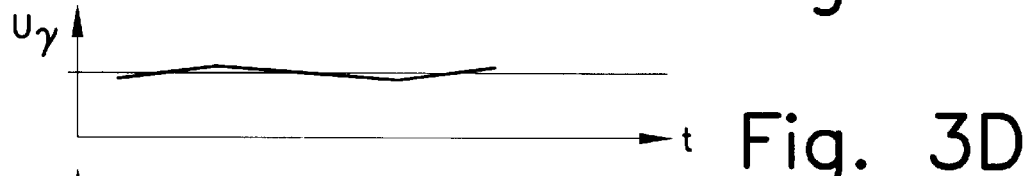
Fig. 3D
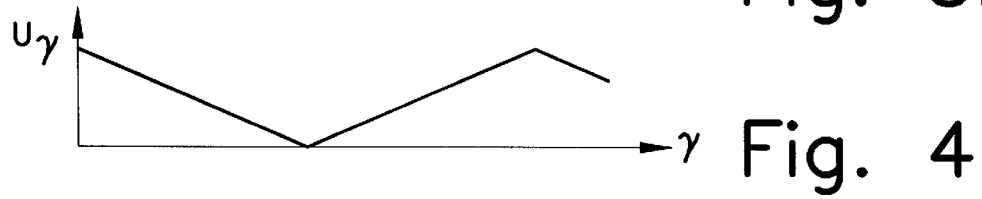
Fig. 4
| S | E | $d_1$ | $\gamma_1$ |
|---|---|---|---|
| 11 | 21 | $d_1(11,21)$ | $\gamma_1(11,21)$ |
| 11 | 22 | $d_1(11,22)$ | $\gamma_1(11,22)$ |
| 11 | 23 | $d_1(11,23)$ | $\gamma_1(11,23)$ |
| ⋮ | ⋮ | ⋮ | ⋮ |
| ⋮ | ⋮ | ⋮ | ⋮ |
| ⋮ | ⋮ | ⋮ | ⋮ |
| 12 | 21 | $d_1(12,21)$ | $\gamma_1(12,21)$ |
| 12 | 22 | $d_1(12,22)$ | $\gamma_1(12,22)$ |
| ⋮ | ⋮ | ⋮ | ⋮ |
| ⋮ | ⋮ | ⋮ | ⋮ |
| ⋮ | ⋮ | ⋮ | ⋮ |
| 18 | 28 | $d_1(18,28)$ | $\gamma_1(18,28)$ |
Fig. 5

METHOD FOR DETERMINING THE POSITION OF AN OBJECT

FIELD OF THE INVENTION

The present invention relates to a method for determining the position of an object with reference to a measurement device having an optical transmitter which emits a light beam at a varying transmission angle, and having an angularly resolving optical receiver spaced away from the transmitter, a conclusion being drawn, from the respective transmission angle and from the respective angle at which the receiver receives radiation reflected from the object (reception angle), as to the resolution cell, defined by the angular resolution of the transmitter and the receiver, in which the object is located.

BACKGROUND INFORMATION

To determine the position of an object, it is known to use, among other things, an optical triangulation method. For example, in: J. A. Marzalee, R. A. Myllyla: Performance test of an angular scan LED array-based range imaging sensor, Proc. of the SPIE—the International Society for Optical Engineering, 2088 (1994), pp. 59–68. The measurement accuracy of such methods can be quite accurate if the angular resolution of the transmitter and receiver is high, but transmitters and receivers with limited angular resolution are used for reasons which include cost. The result is relatively large resolution cells whose extension in the longitudinal direction—perpendicular to the receiver/transmitter axis— becomes larger with increasing range from the measurement device.

European Patent Application No. 0 479 273 describes a method for determining the distance of an object with respect to a measurement device which is based on the radar principle. In this European Patent Application, the distance of the object to be located is determined by phase comparison between a modulated transmitted signal and a received signal reflected from the object.

It is the object of the present invention to configure an easily implemented optical triangulation method in such a way that the positional resolution is as high as possible for the measurement of the range of an object to be located.

SUMMARY OF THE INVENTION

This object is achieved, using the method according to the present invention, in that the light beam emitted from the transmitter is modulated; that the phase difference between the modulation of the transmitted light beam and the modulation of the received radiation is measured; that the individual resolution cells are defined by discrete transmission angles and reception angles, an address of a memory at which a pertinent phase difference and a distance from the measurement device are stored being allocated to each combination of discrete transmission and reception angles; and that the position of the object within a resolution cell is determined from the measured phase difference and from the phase difference values and distance values stored with reference to the resolution cell in the memory.

The method according to the present invention yields a substantial increase in positional resolution, in particular for ranges which are greater than the distance between transmitter and receiver. The method according to the present invention furthermore has the advantage that it requires only an extremely small additional outlay as compared with the known triangulation methods.

The method and the measurement device according to the present invention can be used for a variety of tasks, and adapted to them in terms of their configuration. They are suitable, for example, as proximity warning systems for motor vehicles and for monitoring purposes.

The method according to the present invention can be used for a variety of tasks. It is suitable, for example, for implementing a proximity warning device for motor vehicles.

A development of the method according to the invention consists in the fact that the transmission angle and the reception angle have discrete values; and that the resolution cell in which an object is located is read out from a stored table for the respective combination of transmission and reception angle that is present.

This development on the one hand makes possible relatively simple optical transmitters and receivers, and does not require complex trigonometric calculations.

A first procedure for determining the distance of an object from the measurement device entails reading out from the memory, for the respective resolution cell in which the object is located, the distances $d_1$ and $d_2$ and phase differences $y_1$ and $y_2$ of the points closest to and farthest from the measurement device; and from these distances $d_1$, $d_2$ and phase differences $y_1$, $y_2$ and from the measured phase difference y, calculating the distance d of the object from the measurement device using the equation $d=d_1+(d_2-d_1)*(y-y_1)/(y_2-y_1)$.

A second procedure for determining the distance of an object from the measurement device entails reading out from the memory, for the respective resolution cell in which the object is located, the distance $d_1$ and phase difference $y_1$ of the point closest to the measurement device; and from that distance $d_1$, the phase difference $y_1$, and the measured phase difference y, calculating the distance d of the object from the measurement device using the equation $d=d_1+(y-y_1)*c/2\pi f$, where c is the speed of light and f is the modulation frequency.

With the method according to the present invention, it is possible to ensure that the phase difference is unique by performing the modulation using a frequency which corresponds to a wavelength of at least four times the length of the longest resolution cell to be sensed.

BRIEF DESCRIPTION OF THE DRAWINGS

FIG. 3A shows a first voltage vs. time graph used by a phase comparison circuit illustrated in FIG. 2 according to the method of the present invention.

FIG. 3B shows a second voltage vs. time graph used by the phase comparison circuit illustrated in FIG. 2.

FIG. 3C shows a third voltage vs. time graph used by the phase comparison circuit illustrated in FIG. 2.

FIG. 3D shows a fourth voltage vs. time graph used by the phase comparison circuit illustrated in FIG. 2.

FIG. 4 shows a diagram of a correlation between a output voltage of the phase comparison circuit and a phase difference.

FIG. 5 shows a table for analyzing a transmission angle and a reception angle.

DETAILED DESCRIPTION

Figure 1:
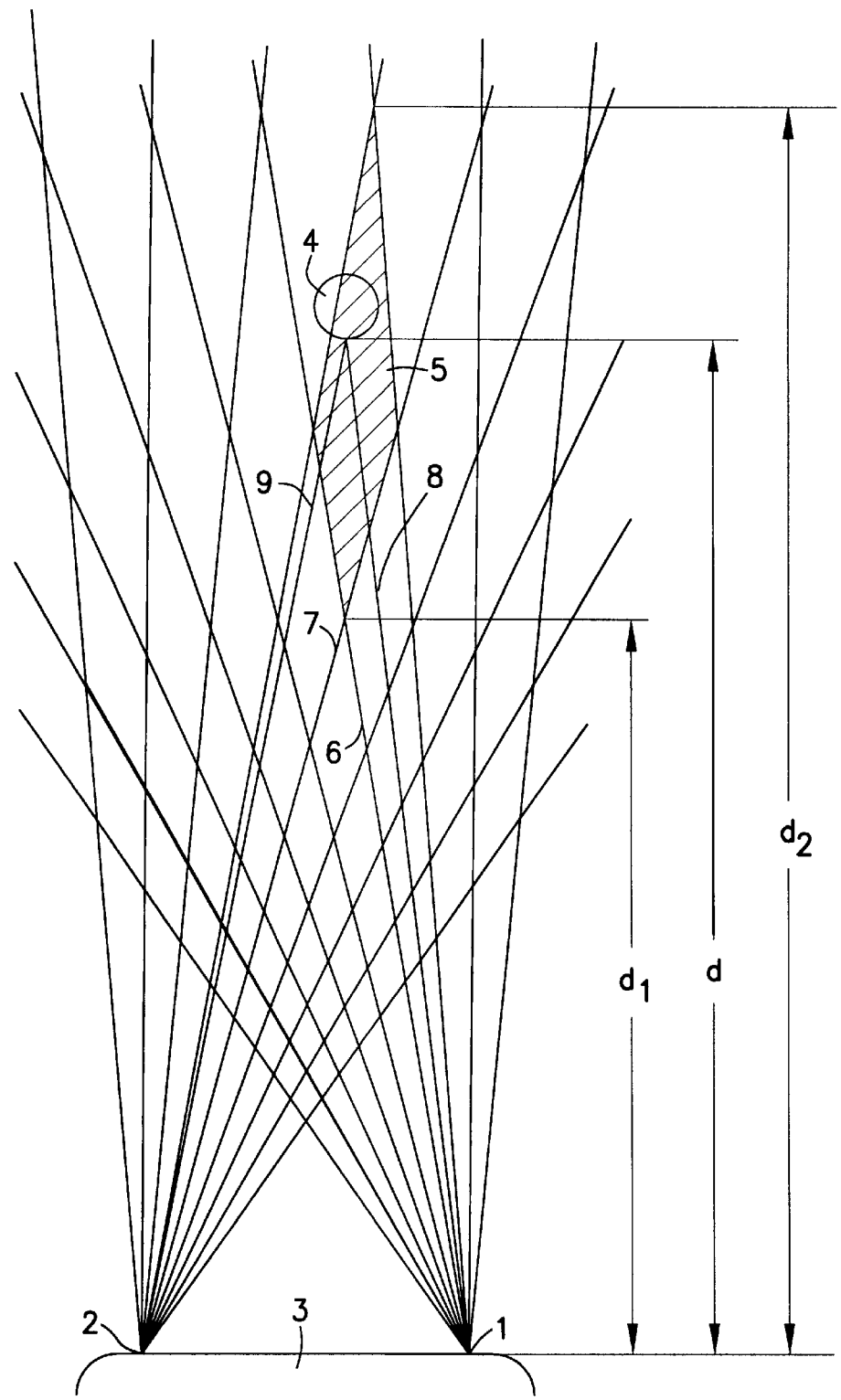
FIG. 1 shows a diagram for sensing an object using a transmitter and a receiver for a method according to the present invention.

FIG. 1 schematically shows a transmitter 1 and a receiver 2 which are arranged at a predefined distance on a measurement device 3 which is merely outlined. The lines proceeding from transmitter 1 and receiver 2 represent the boundaries of, respectively, a diverging beam of transmitter 1 and a reception angle to be resolved by transmitter 2. In an implementation of transmitter 1 and receiver 2 with each having a converging lens and discrete light sources and optoelectric converters, as will be explained below in conjunction with FIG. 2, gaps may exist between the respective individual diverging transmitted beams and the reception angles. Since the objects to be sensed are usually larger than one resolution cell and larger than the gaps, however, this does not result in any impairment of the method according to the present invention.

All that can be ascertained with the known method is that an object 4 is located within at least one resolution cell 5. These resolution cells become longer with increasing distance from measurement device 3, so that the resolution decreases. All that is determined with the known method is therefore that the distance d of the object from measurement device 3 lies between the values $d_1$ and $d_2$.

By modulating the light emitted from the transmitter and measuring the phase difference, the difference in transit time and thus also the difference in length between a path made up of notional beams 6 and 7 and a path made up of beams 8 and 9 can be determined. Since what is substantially important in the method according to the present invention is the improvement in length resolution at great distances, it is possible with the method according to the present invention to take into account a beam passing from the measurement device to the object and back, rather than an accurate trigonometric calculation, when analyzing this difference in transit time. The simple geometrical relationships which then result will be explained later.

Figure 2:
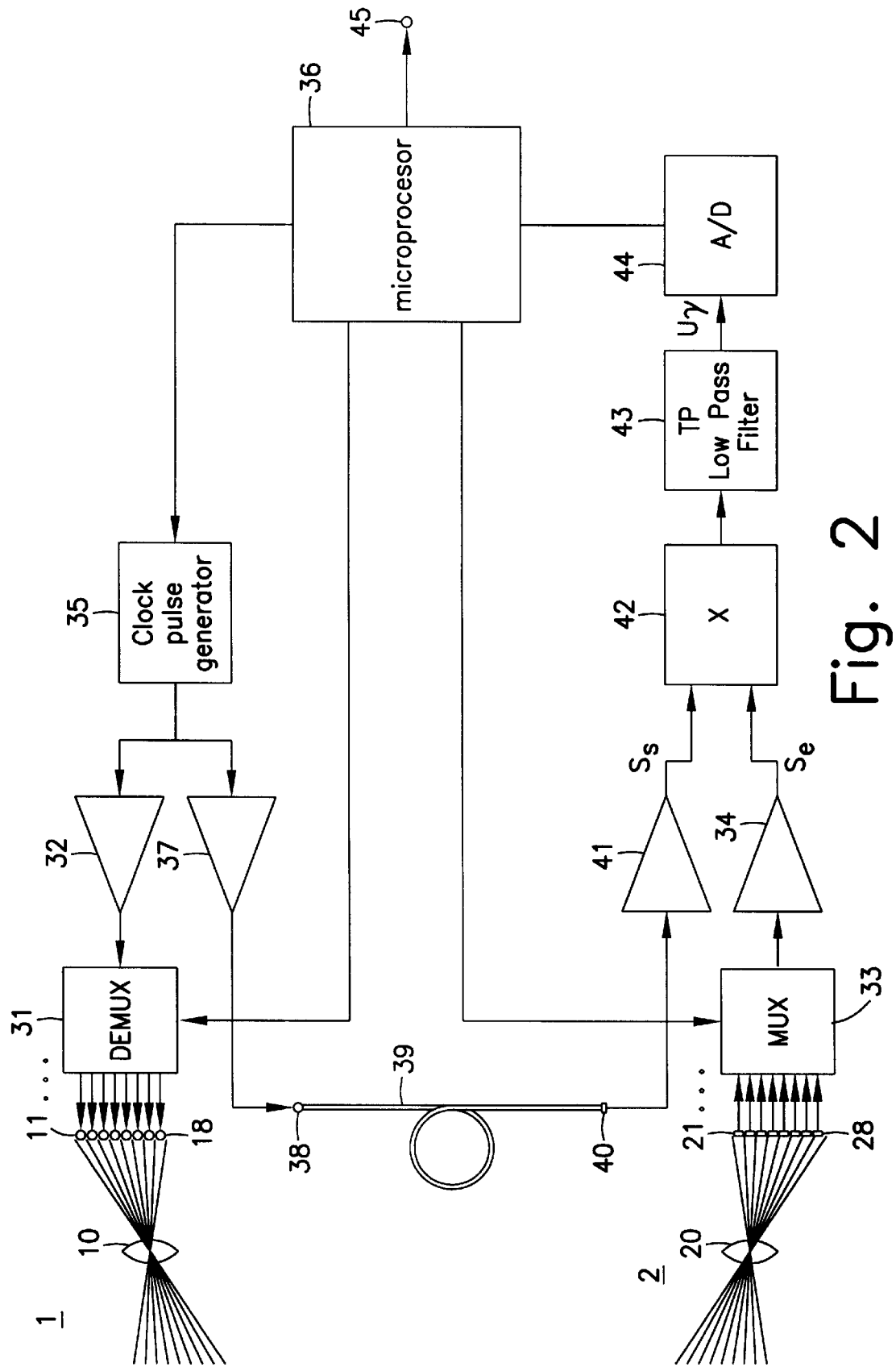
FIG. 2 shows a diagram of a device according to the present invention.

FIG. 2 shows a transmitter 1 having a converging lens 10 and eight light-emitting diodes 11 through 18, which are arranged right next to one another in a row. The receiver includes a converging lens 20 and eight optoelectric converters 21 through 28, in particular photodiodes or phototransistors, arranged in a row.

A demultiplexer 31 forwards the output voltage of an output stage 32 sequentially to the individual light-emitting diodes 11 through 18. Correspondingly, a multiplexer 33 is provided which, sequentially in time, connects each one of photodiodes 21 through 28 to the input of a preamplifier 34. To modulate the light radiated by transmitter 1, there is delivered to output stage 32 a pulsed voltage whose frequency depends on the size of the resolution cells, which in turn depends on the distance between transmitter and receiver and the measurement range of the measurement device. For distances of a few decimeters and measurement ranges up to 10 m, frequencies in the range from 10 MHz to 100 MHz are possible. The pulses delivered to output stage 32 are generated by a clock pulse generator 35 which in turn is controlled by a microprocessor 36.

In order to allow the measurement of phase differences between the modulation of the transmitted and received light, a reference signal whose phase relationship is independent of the particular distance is required. This is generated, in the exemplary embodiment, by the fact that the output signal of the clock pulse generator is conveyed through a further output stage 37, a further light-emitting diode 38, a fiber optic cable 39, a photodiode 40, and a preamplifier 41. Output signals $S_e$ and $S_s$ of preamplifiers 34 and 41 are delivered to a phase comparator which consists of a multiplier 42 and a low-pass filter 43.

The operation of the phase comparator will be explained with reference to FIGS. 3A–3D, with, signals $S_s$ and $S_e$ having a phase difference γ. This is processed as the phase difference to be measured between the modulation at the transmitter and the modulation at the receiver, taking into account the transit times in the various circuits and in fiber optic cable 39. The product $S_e \times S_s$ has a duty factor which changes with phase difference γ. There is thus available at the output of low-pass filter 43, which acts as an integrator, a voltage $U_\gamma$ which, apart from a slight ripple, represents the respective phase difference. FIG. 4 shows a graph of a voltage $U_\gamma$ as a function of phase differencey.

Voltage $U_\gamma$ is conveyed via an A/D converter 44 to an input of microcomputer 36. Microcomputer 36 and thus also the entire measurement device 3 has an output 45 at which data indicating the position of objects are available, and can be forwarded to corresponding output devices (for example to a display) or to processing devices.

Microcomputer 36 moreover controls demultiplexer 31 and multiplexer 33 in such a way that the light sent out from each light-emitting diode and reflected from an object is "interrogated" by each of photodiodes 21 through 28.

FIG. 5 shows a table, stored in the memory of microcomputer 36 (FIG. 2), in which distance $d_1$ and phase angle $\gamma_1$ are stored at addresses which represent the combinations of transmission angle and reception angle. For example, if photodiode 22 receives reflected light while light-emitting diode 12 is illuminated, the values $d_1$ (12,22) for $d_1$ and $\gamma_1$ (12,22) for $\gamma_1$ are read out. These values can be calculated in advance and stored in each measurement device of a production series, or can be determined in a calibration operation for each individual measurement device and stored. The range of object 4 (FIG. 1) can then be calculated using the equation $d = d_1 + (\gamma - \gamma_1) \times c / (4\pi \times f)$.

In optical measurement methods which are based on the emission of light and reception of reflected light, the light that is sent out is often modulated to suppress the effects of light interference. This can also be done with the method according to the present invention. If the modulation according to the present invention is not sufficient for this purpose, a further modulation can be performed, for example in a substantially lower frequency range.

What is claimed is:

1. A method for determining a position of an object using a measurement device, the measurement device including an optical transmitter and an angularly resolving optical receiver situated at a predetermined distance from the optical transmitter, the method comprising the steps of:

defining each of a plurality of resolution cells as a function of a respective set of discrete predetermined transmission and reception angles, the discrete predetermined transmission and reception angles providing an angular resolution of the optical transmitter and the angularly resolving optical receiver;

for each respective set of the discrete predetermined transmission and reception angles, allocating an address in a memory device for storing a corresponding predetermined phase difference and a corresponding predetermined distance from the measurement device to a corresponding cell of the resolution cells;

emitting a light beam, using the optical transmitter, at a particular varying transmission angle;

modulating the light beam to generate a first modulated signal;

receiving a radiation reflected from the object, using the angularly resolving optical receiver, at a particular reception angle;

modulating the received radiation to generate a second modulated signal;

determining a phase difference between the first modulated signal and the second modulated signal;

identifying a particular cell of the resolution cells as a function of the particular varying transmission angle and the particular reception angle, wherein the object is located in the particular cell; and determining the position of the object within the particular cell as a function of:
the determined phase difference,
the predetermined phase differences, stored in the memory device, which correspond to the particular cell, and
the predetermined distances, stored in the memory device, which correspond to the particular cell.

2. The method according to claim 1, further comprising the steps of:

for the particular cell, retrieving a first distance $d_1$ and a second distance $d_2$ of the predetermined distances from the memory device;

for the particular cell, retrieving a first phase difference $y_1$ and a second phase difference $y_2$ of the predetermined phase differences from the memory device, wherein the first distance $d_1$ and the first phase difference $y_1$ correspond to a first point of the particular cell which is closest to the measurement device, and the second distance $d_2$ and the second phase difference $y_2$ correspond to a second point of the particular cell which is farthest from the measurement device, and wherein the position determining step includes the substep of:

calculating a particular distance d from the object to the measurement device according to the following equation:

$$d=d_1+(d_2-d_1)\cdot(y-y_1)/(y_2-y_1),$$

where y is the determined phase difference.

3. The method according to claim 1, further comprising the step of:

for the particular cell, retrieving a particular distance $d_1$ of the predetermined distances and a particular phase difference $y_1$ of the predetermined phase difference from the memory device;

wherein the first distance $d_1$ and the phase difference $y_1$ correspond to a point of the particular cell which is closest to the measurement device, and wherein the position determining step includes the substep of:

calculating a particular distance d from the object to the measurement device according to the following equation:

$$d=d_1+(y-y_1)*c/(4\pi\times f),$$

where c is a speed of light, f is a modulation frequency, and y is the determined phase difference.

4. The method according to claim 1, wherein the light beam and the received radiation are modulated using a frequency which corresponds to a wavelength of at least four times a length of a longest cell of the resolution cells.

* * * * *